May 4, 1965   D. DANIELS   3,181,858
WORK SUPPORT
Filed April 26, 1962
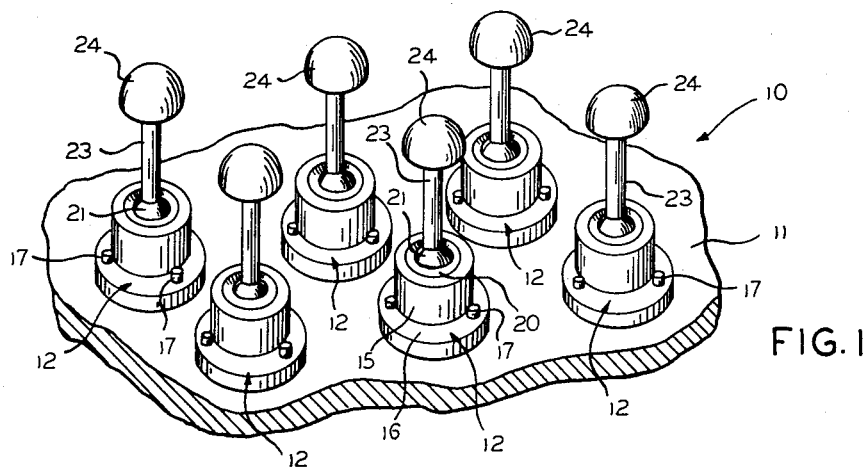
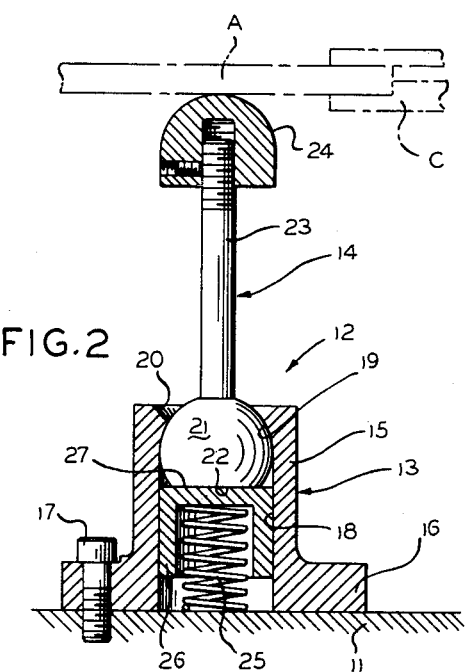
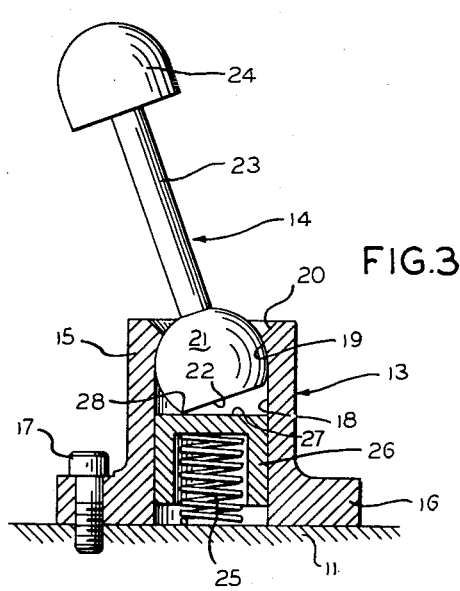
INVENTOR.
DENNIS DANIELS
BY
ATTORNEYS

3,181,858
WORK SUPPORT
Dennis Daniels, Williamsville, N.Y., assignor to Houdaille Industries, Inc., Buffalo, N.Y., a corporation of Michigan
Filed Apr. 26, 1962, Ser. No. 190,434
7 Claims. (Cl. 269—296)

This invention relates generally to work supports, and more specifically to a yieldable work support which is particularly suited to support an article being moved about in an automatically operated machine.

Although the principles of the present invention may be included in the various devices, a particularly useful application is made in work supports of the type that are adapted to support a workpiece which comprises a large sheet of material which is to be moved about, such as to align various points of the same with respect to a fixed reference point for performing machining operations thereon such as punching. When large sheets of material are to be moved about mechanically on a machine so that the machine may work or operate at various points on such workpiece sheet, it is evident that some type of grasping means will be needed to shift the sheet about. Such a grasping means must extend on both sides of the sheet and must be able to be moved about in any horizontal direction. Placing such a grasping means beneath a workpiece creates a problem in supporting the same.

The present invention contemplates the utilization of a yieldable support for the workpiece or other article, the work support being capable of delivering a relatively high supporting force, and being yieldable laterally by tilting in response to a relatively low lateral force applied thereagainst by the grasping means of the workpiece when it engages such work support. Upon disengagement of the grasping means from the work support, the work support erects itself and resumes its article-supporting function.

Accordingly, it is an object of the present invention to provide an improved work support.

Another object of the present invention is to provide a work support which will tilt out of work-supporting position.

Yet another object of the present invention is to provide a work support which will tilt out of work-supporting condition or position in response to a tilting force which is somewhat less than the maximum capable workpiece-supporting force of such work support.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a perspective view of a number of work supports provided in accordance with the principles of the present invention, jointly supported on a fragmentarily illustrated part of a machine;

FIGURE 2 is an enlarged cross-sectional view of each of the work supports shown in FIGURE 1; and FIGURE 3 is a cross-sectional view corresponding to FIGURE 2, but wherein the work support is illustrated in a tilted position.

As shown on the drawings:

The principles of this invention are particularly useful when embodied in a work support means such as illustrated in FIGURE 1, generally indicated by the numeral 10. The work support means includes a rigid part 11 of the machine to which there is attached a plurality of individual work supports, each identified by the numeral 12.

Each of the work supports 12 has an internal configuration such as indicated in FIGURE 2. The individual work support 12 includes a rigid base generally indicated at 13 and a tiltable support member generally indicated at 14. The rigid base 13 includes a holder 15 having a flange 16 adapted to be secured to the machine 11 as by screws 17. It is evident that the member 11 shown in FIGURE 2 could comprise a separate plate secured to the bottom of the flange 16 as by the screws 17. The holder 15 has a cylindrical surface 18 which terminates at its upper end 19 to define a downwardly directed socket, there being an opening in the socket 19 defined by means 20 which also serve as an angular limit stop for the tiltable support member 14.

The support member 14 includes a ball 21 having a flat surface 22 directed away from the socket 19. The tiltable support member 14 further includes a support rod 23 secured to the ball 21 and terminating in a threaded upper end on which is carried a knob 24, the upper surface of which is adapted to engage the article A.

A spring 25 acts to resiliently bias the support member 14 in an upward direction with the ball 21 disposed against the socket 19. To this end, the spring 25 acts through a plunger 26 which has an upper surface 27 normally in engagement with the lower surface 22 of the ball 21. The plunger 26 is slidably guided by the cylindrical surface 18 of the holder 15.

It is evident that a number of work supports 12 of the same length may jointly support the article A in a plane, and that each will have a minimum amount of frictional drag with respect to the lower surface of the article A as it is slid thereover. The article A in this example is moved about by a clamping mechanism C having a lower portion which extends below the bottom surface of the article A so that occasionally the clamping mechanism C will bump into one of the knobs 24. When this happens, the support member 14 tilts angularly out of the way to the extent needed to enable the clamping mechanism C to pass directly thereover, and as soon as the mechanism C has passed by, the spring 25 restores the support member 14 to the erect position illustrated in FIGURE 2.

The actual tilting movement is illustrated in FIGURE 3. The support member 14 pivots about the center of the socket 19 which is also the center of the ball 21. However, in doing so, the outer edge 28 of the surface 22 moves downwardly against the surface 27, thereby depressing the plunger 26 and compressing the spring 25 to store energy therein. When the knob 24 is free of obstruction, the spring 25 expands, and acting through the plunger 26, having the surface 27, acts on the edge 28 to restore the support member 14 to the erect position, the erect position here being defined as being that which is obtained when the surface 27 engages the surface 22.

The support member 14 operates much like a bell crank having moment arms of unequal length. From the edge 28 to the center of the ball 21, there is in effect a moment arm or lever arm which is employed to compress the spring 25. This short moment or lever arm is thus rigidly connected to a somewhat longer rigid moment or lever arm which in effect extends from the center of the ball 21 to the point on the knob 24 where the knob 24 is engaged as by the clamping mechanism C. In the illustrated embodiment, the ratio of the longer lever arm to the shorter lever arm is thus approximately 6 to 1. It is therefore evident that a lateral force applied to the knob 24 will begin to compress the spring 25 where such lateral force is only ⅙ of that which would begin to compress the spring 25 if a straight downward force were applied by the article A in FIGURE 2. Thus the maximum article supporting capacity of this device is approximately six times as great as the force needed to deflect it out of position, even though a single spring is employed to react to both such forces.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Work support means comprising:
    (a) rigid base means; and
    (b) a plurality of support members extending upwardly from said base means in spaced apart relation to each other and each cooperative with the other members only when erect to support an article, each of said support members being individually tiltable away from the article in response to a lateral force less than its individual maximum supporting force.

2. A work support comprising:
    (a) a rigid holder defining a socket;
    (b) a ball engaging said socket;
    (c) a spring biasing said ball against said socket;
    (d) a support rod secured to said ball; and
    (e) an article-engaging knob secured to the upper end of said support rod and having a spherical outer surface for engaging the article at a single point of contact.

3. A work support comprising:
    (a) a rigid holder adapted to be secured to a mounting surface and defining a socket;
    (b) a ball having a spherical surface engaging said socket and having a substantially flat surface directed away from said socket;
    (c) a spring acting on said flat surface and biasing said ball against said socket; and
    (d) a tiltable support rod secured at one end to said ball, and adapted to support an article at the other end.

4. A work support comprising:
    (a) a rigid holder defining a downwardly directed annular socket;
    (b) a ball having a spherical surface engaging said socket and having a substantially flat surface directed away from said socket;
    (c) a plunger slidably guided in said holder and having an upper surface continually engaging at least a portion of said flat surface on said ball;
    (d) a spring biasing said plunger against said flat surface; and
    (e) a tiltable support rod secured to said ball and extending upwardly through said annular socket.

5. A work support comprising:
    (a) a rigid base comprising a socket;
    (b) a support member adapted at one end to engage an article, and at its other end comprising a ball disposed in said socket, said ball having a substantially flat surface directed away from said socket; and
    (c) a spring continually operative on at least a portion of said flat surface to continually bias said support member toward an erect position, while being yieldable to enable the support member to tilt against such bias.

6. A work support comprising:
    (a) a rigid holder defining a downwardly directed annular socket;
    (b) a ball having a spherical surface engaging said socket and having a substantially flat surface directed away from said socket, the outer edge of said flat surface lying in said spherical surface of the ball;
    (c) a tiltable support rod secured to said ball and extending upwardly through said annular socket;
    (d) a plunger slidably guided in said holder and having an upper surface normally engaging said flat surface on said ball, and continually engaging said outer edge of said flat surface whenever said rod is in a tilted position; and
    (e) a spring biasing said plunger against said ball.

7. A work support comprising:
    (a) a rigid holder adapted to be secured to a mounting surface and defining a downwardly directed annular socket;
    (b) a ball having a spherical surface engaging said socket and having a substantially flat surface directed away from said socket, the outer edge of said flat surface lying in said spherical surface of the ball;
    (c) a tiltable support rod secured to said ball and extending upwardly through said annular socket;
    (d) an article-engaging knob secured to the upper end of said support rod, and having a spherical outer surface for engaging the article at a single point of contact;
    (e) a plunger slidably guided in said holder and having an upper surface normally engaging said flat surface on said ball, and continually engaging said outer edge of said flat surface whenever said rod is in a tilted position; and
    (f) a spring biasing said plunger against said ball.

References Cited by the Examiner

UNITED STATES PATENTS

| 1,639,441 | 8/27 | Spahr | 269—75 X |
| 1,981,253 | 11/34 | Schulz | 269—75 |
| 2,456,182 | 12/48 | Goble | 269—75 X |

FOREIGN PATENTS 491,252  2/30  Germany.

ROBERT C. RIORDON, *Primary Examiner.*
THOMAS J. HICKEY, *Examiner.*